US006317801B1

(12) United States Patent
Ilkbahar et al.

(10) Patent No.: US 6,317,801 B1
(45) Date of Patent: Nov. 13, 2001

(54) SYSTEM FOR POST-DRIVING AND PRE-DRIVING BUS AGENTS ON A TERMINATED DATA BUS

(75) Inventors: Alper Ilkbahar, Santa Clara, CA (US); Kent R. Townley, Richardson, TX (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/123,097

(22) Filed: Jul. 27, 1998

(51) Int. Cl.[7] .............................. G06F 3/00; G06F 13/00; G06F 5/00
(52) U.S. Cl. .............................................. 710/58; 710/110
(58) Field of Search .............................. 710/58, 108, 110, 710/113, 131, 107, 128, 118; 326/86, 90; 713/600

(56) References Cited

U.S. PATENT DOCUMENTS

| 4,454,591 | * | 6/1984 | Lou ........................................ 364/900 |
| 4,774,422 | * | 9/1988 | Donaldson et al. .................... 326/86 |
| 5,051,619 | * | 9/1991 | Campione ............................... 326/17 |
| 5,127,089 | * | 6/1992 | Gay et al. ............................... 710/108 |
| 5,353,417 | * | 10/1994 | Fuoco et al. ........................... 710/126 |
| 5,396,128 | * | 3/1995 | Dunning et al. ....................... 326/68 |
| 5,524,215 | * | 6/1996 | Gay ....................................... 710/107 |
| 5,627,976 | * | 5/1997 | McFarland et al. ................... 710/128 |
| 5,633,605 | * | 5/1997 | Zimmerman et al. .................. 326/86 |
| 5,635,852 | * | 6/1997 | Wallace .................................. 326/30 |
| 5,635,853 | * | 6/1997 | Kikinis .................................. 326/30 |
| 5,654,927 | * | 8/1997 | Lee ........................................ 365/203 |
| 5,675,809 | * | 10/1997 | Gantt .................................... 713/300 |
| 5,678,009 | * | 10/1997 | Bains et al. ........................... 710/125 |
| 5,796,968 | * | 8/1998 | Takamiya ............................... 710/113 |
| 5,964,856 | * | 10/1999 | Wu et al. ............................... 710/110 |

FOREIGN PATENT DOCUMENTS

| 402143609 | * | 6/1990 | (JP) .................................. G06F/3/00 |
| 405313798 | * | 5/1992 | (JP) . |
| 405135189 | * | 6/1993 | (JP) .................................. G06F/15/78 |
| 406083503 | * | 3/1994 | (JP) .................................. G06F/3/00 |
| 409054751 | * | 2/1997 | (JP) .................................. G06F/13/42 |

* cited by examiner

Primary Examiner—Thomas Lee
Assistant Examiner—Chun Cao
(74) Attorney, Agent, or Firm—Blakely, Sokoloff, Taylor & Zafman LLP

(57) ABSTRACT

A method and apparatus for post-driving and pre-driving a terminated bus that shortens dead cycles on a bus during bus master change-overs. In one embodiment, a first bus agent giving up control of the bus drives the bus to termination voltage levels during a first portion of the dead cycle. A second bus agent gaining control of the bus also drives the bus to termination voltage levels during a last portion of the dead cycle. For the time period between the first portion and the second portion, termination components such as resistors or transistors maintain the bus at termination voltage levels. By driving the bus to termination voltage levels with bus agents, bus transients are settled more quickly than with termination components alone, which improves performance of the bus over configurations pulled to termination voltage levels with termination components alone.

19 Claims, 6 Drawing Sheets

SYSTEM FOR POST-DRIVING AND PRE-DRIVING BUS AGENTS ON A TERMINATED DATA BUS

FIELD OF THE INVENTION

The present invention relates to computer systems. More particularly, the present invention relates to change of control between agents on a terminated bus.

BACKGROUND OF THE INVENTION

Prior art terminated bus systems typically have one or more bus cycles (e.g., dead cycles) during which bus agents transfer control of the bus. During the dead cycle no bus agent drives the bus. Because the bus is terminated, the terminating components pull the bus lines up to a predetermined voltage level. The length of the dead cycle is determined, in part, on how quickly the terminating components can settle transient signals on the bus. In general, settling refers to the lines of the bus reaching a predetermined voltage level and overcoming ringbacks, reflections and other transients.

Transients may occur as the result of switching control of the bus lines from a first bus agent to the terminating components and again when switching control from the terminating components to a second bus agent. When the first bus agent gives up control of the bus, the first bus agent tri-states the input/output (I/O) buffers coupled to the bus by placing the buffers in a high-impedance state.

The terminating components take control of the bus lines as left by the first bus agent when the first bus agent's bus access cycle is completed. The terminating components then pull the bus lines up to a known voltage. The terminating components drive the bus lines to the known voltage at least until any transients on the bus have settled. Because during normal bus operation the termination components provide termination and the bus agent provides source termination, settling of transients takes longer for dead cycles than for normal bus cycles. In other words, during normal bus operation, more termination components are operating than during dead cycles, which results is faster settling of transients.

When a second bus agent takes control of the bus from the terminating components the second bus agent must overcome transients associated with the change of bus control before signals on the bus can be used to convey valid data. Because the second bus agent provides source termination in addition to the end termination provided by the termination components, the second bus agent settles the bus faster than the termination components alone during the dead cycle.

Because the time required to settle transient signals cannot be used to convey valid data, what is needed is a method and apparatus for decreasing the time during which the bus is not used to transfer valid data.

SUMMARY OF THE INVENTION

A method and apparatus for post-driving and pre-driving a terminated bus is described. A first bus agent drives one or more bus lines to a known voltage after completing a first bus access cycle in which the first bus agent is a bus master. A second bus agent drives the one or more bus lines to the known voltage prior to beginning a second bus access cycle in which the second bus agent is the bus master. Termination components drive the one or more bus lines to the known voltage when the one or more bus lines are not driven by either the first bus agent or the second bus agent.

BRIEF DESCRIPTION OF THE DRAWINGS

The present invention is illustrated by way of example, and not by way of limitation, in the figures of the accompanying drawings in which like reference numerals refer to similar elements.

DETAILED DESCRIPTION

A method and apparatus for post-driving and pre-driving a terminated bus is described. In the following description, for purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

The present invention provides a method and apparatus for shortening dead cycles on a bus via post-driving and pre-driving of the bus by bus agents during bus master change-overs. In one embodiment, a first bus agent giving up control of the bus drives the bus to termination voltage levels during a first portion of the dead cycle. A second bus agent gaining control of the bus also drives the bus to termination voltage levels during a last portion of the dead cycle. For the time period between the first portion and the second portion, termination components such as resistors or transistors drive the bus to termination voltage levels. By driving the bus to termination voltage levels with bus agents, bus transients are settled more quickly than with termination components alone, which improves performance of the bus over configurations pulled to termination voltage levels with termination components alone.

Figure 1A:
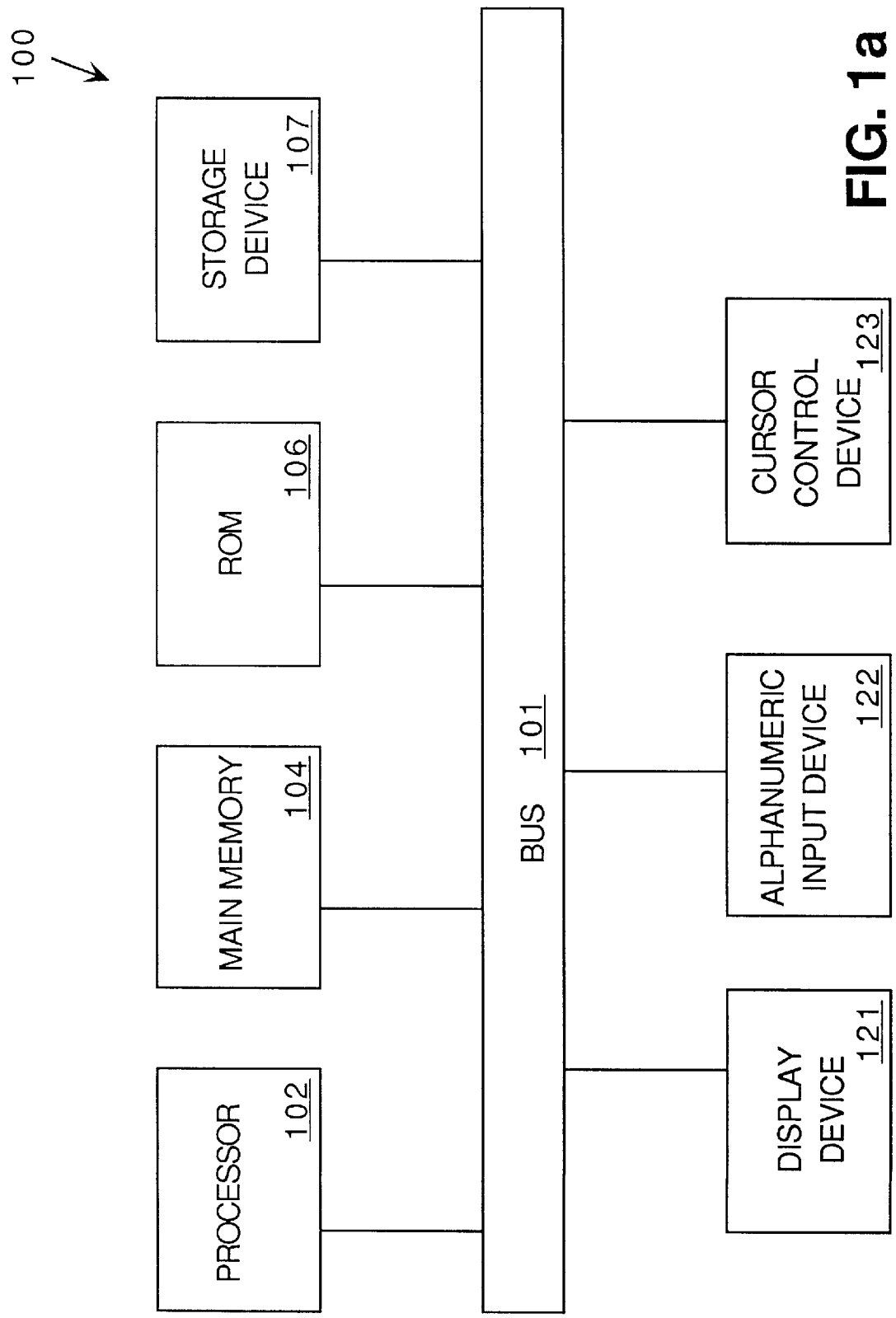
FIG. 1a is one embodiment of a single-processor computer system.

FIG. 1a is one embodiment of a computer system. Computer system 100 comprises bus 101 or other device for communicating information, and processor 102 coupled with bus 101 for processing information. In one embodiment processor 102 is a processor from the Intel family of processors available from Intel Corporation of Santa Clara, Calif.; however, other processors may also be used. Computer system 100 further comprises random access memory (RAM) or other dynamic storage device 104 (referred to as main memory), coupled to bus 101 for storing information and instructions to be executed by processor 102. Main memory 104 also can be used for storing temporary variables or other intermediate information during execution of instructions by processor 102. Computer system 100 also comprises read only memory (ROM) and/or other static storage device 106 coupled to bus 101 for storing static information and instructions for processor 102. Data storage device 107 is coupled to bus 101 for storing information and instructions.

Data storage device 107 such as magnetic disk or optical disc and corresponding drive can be coupled to computer system 100. Computer system 100 can also be coupled via bus 101 to display device 121, such as a cathode ray tube (CRT) or liquid crystal display (LCD), for displaying information to a computer user. Alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121.

In one embodiment, processor 102 and one or more of the components coupled to bus 102, such as main memory 104, are source synchronous components. Of course, any one or more components of computer system 100 can be source synchronous. Thus, computer system 100 can be either a partially source synchronous or fully source synchronous environment. In one embodiment, computer system 100 is a differential-strobe source synchronous system in which complementary strobe signals are communicated in parallel with data signals over the bus. Alternatively, computer system 100 is a single-strobe source synchronous system in which a single strobe signal is communicated in parallel with data signals over the bus.

In one embodiment, bus 101 is an externally terminated bus. Bus 101 may be terminated by any manner known in the art. Terminating a bus refers to pulling each terminated line of the bus to a known voltage when no agent is driving the bus. This may be accomplished, for example, by coupling each end of a bus line to a known voltage, such as a voltage supply output via a resistor or transistor. Typically, the termination voltage is the voltage corresponding to a high logic level; however, other voltage levels may also be used.

Figure 1B:
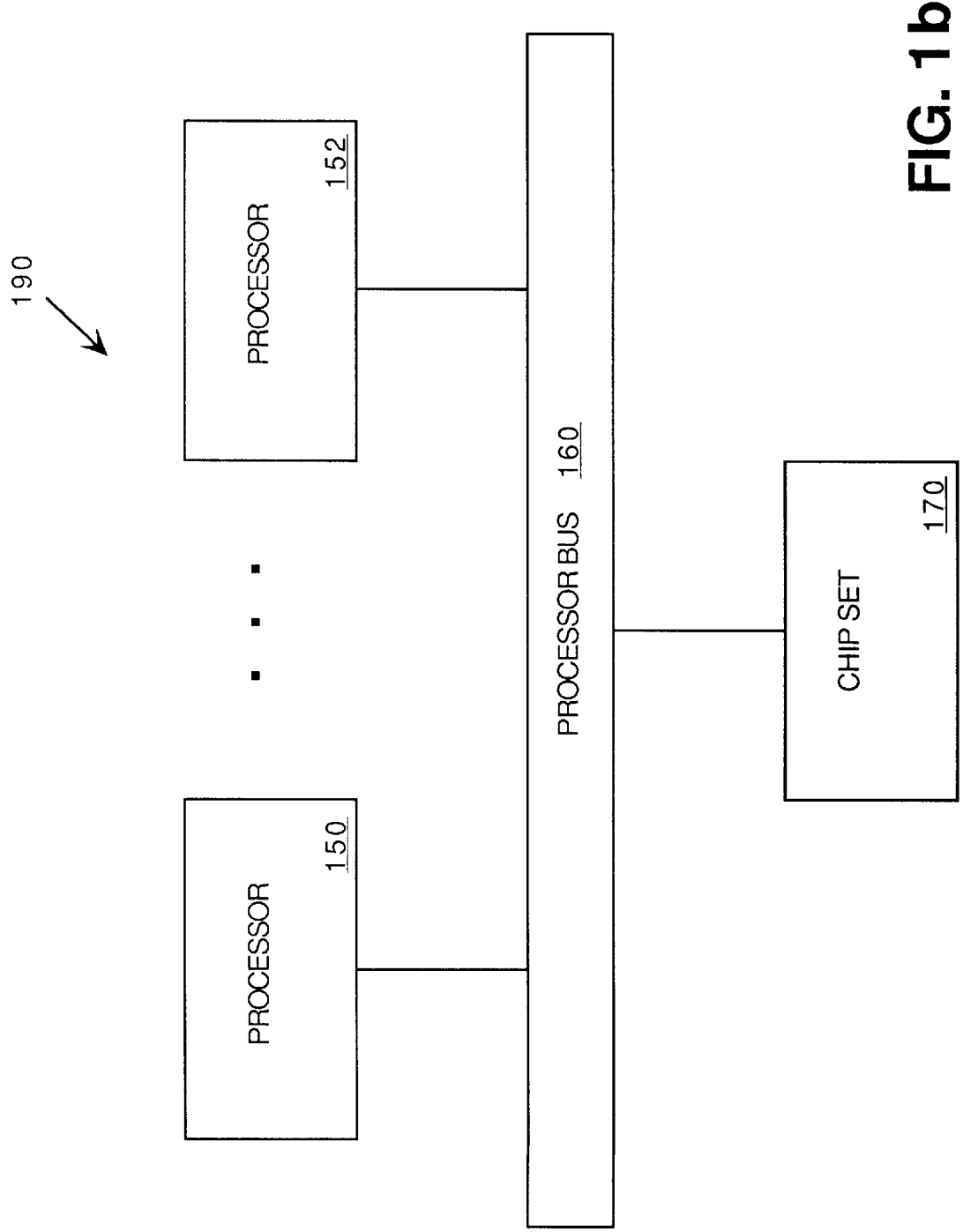
FIG. 1b is one embodiment of a multi-processor computer system.

FIG. 1b is one embodiment of a multiprocessor computer system. Computer system 190 generally includes multiple processors (e.g., processor 150 through processor 152) coupled to processor bus 160. Chip set 170 provides an interface between processor bus 160 and other components of computer system 190, such as a system bus (not shown in FIG. 1b). Other system components, such as those described with respect to computer system 100 can be coupled to the system bus.

Computer system 190 is a higher performance system than computer system 100 in both bus architecture and number of processors. In one embodiment, processor bus 160 is an externally terminated bus that communicates information in a source synchronous manner. Processors 150 and 152 can be any type of processor. In one embodiment, processors 150 and 152 are from the Intel Corporation family of processors. Chip set 170 provides an interface between processor bus 160 and the remaining components of computer system 190 in any manner known in the art.

Figure 2:
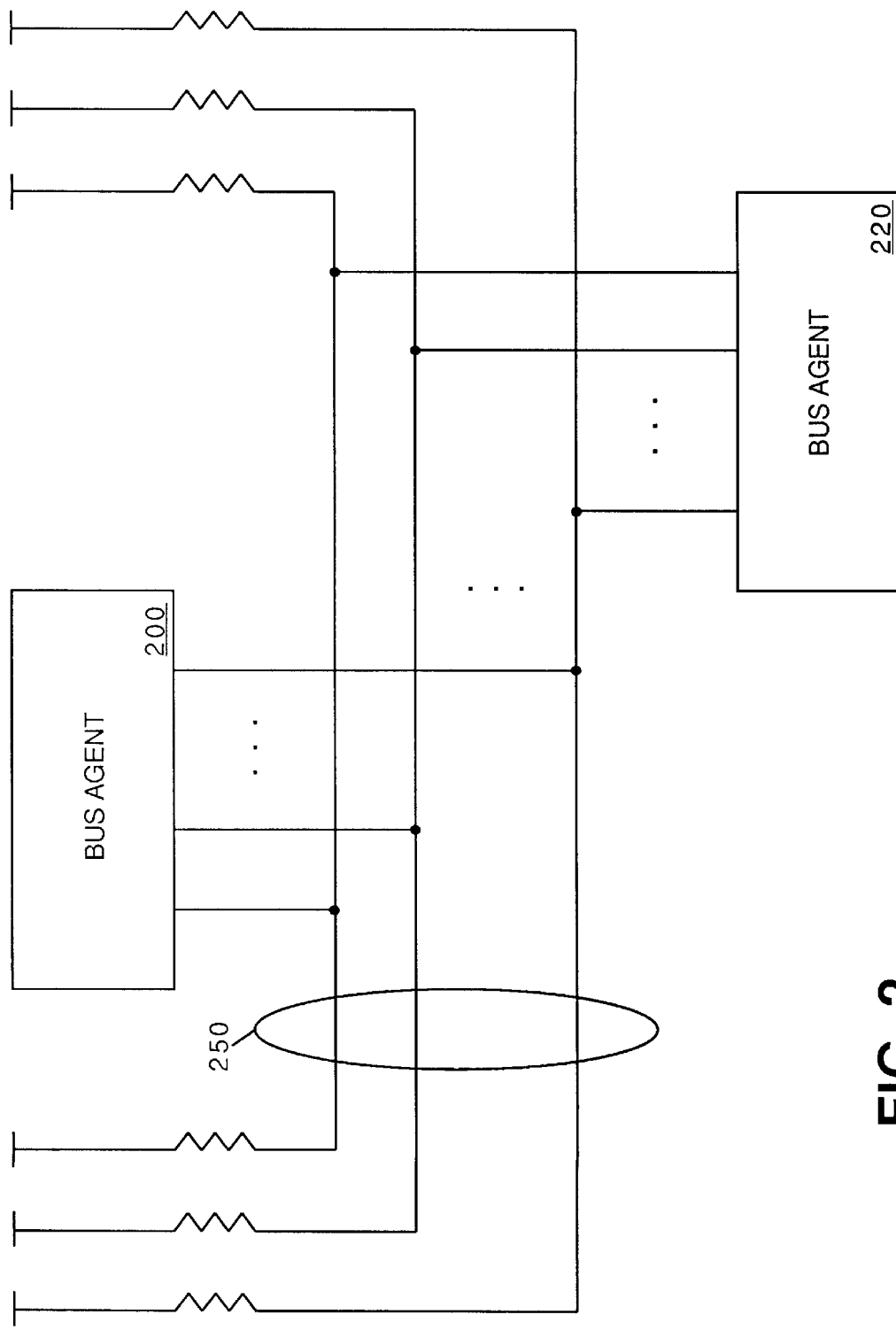
FIG. 2 is one embodiment of an externally terminated bus having two bus agents.

FIG. 2 is one embodiment of an externally terminated bus having two bus agents. In one embodiment, each line of bus 250 is externally terminated by a pair of pull-up resistors or other devices, such as transistors, that allow the individual bus lines to be pulled up to a known voltage when no agents are driving bus 250.

The system of FIG. 2 includes two bus agents, labeled 200 and 220, which can be any of the components of computer system 100, such as, for example, processor 102, main memory 104, etc., or components of computer system 190, such as, for example, processors 150 and 152 or chip set 170, or any components of a computer system that have not been shown but are capable of communicating over a bus. Bus agents 200 and 220 can also be components not described with respect to FIGS. 1a and 1b, such as, for example, I/O devices, or any other component that can be coupled to bus 250.

In one embodiment, each line of bus 250 is terminated with a pair of resistors, one of which is coupled between each end of the individual bus lines and a known voltage. When bus 250 is not being driven by a bus agent, the lines of bus 250 are pulled up to a known voltage through the respective resistors.

Alternatively, each line of bus 250 is terminated with a pair of p-channel metaloxide semiconductor (PMOS) transistors each having a drain coupled to an end of the bus line terminated (not shown in FIG. 2). Each transistor has a source coupled to a voltage supply output or other voltage source. The gates of the transistors are coupled to control circuitry that switches the transistors on at appropriate times to pull the voltage of the bus lines to a known level. Line termination is well known in the art and will not be described further with respect to the present invention.

In a system having multiple bus agents and a terminated bus, the bus agents that are not driving the bus place their output lines in a high-impedance state (e.g., tri-state the outputs). The bus agent (e.g., bus master) that is driving the bus outputs signals in any manner appropriate for the bus interface.

For example, bus agent 200 can drive bus 250 for a number of bus cycles. During this time, bus agent 220 tri-states any output lines coupled to bus 250. When bus agent 200 relinquishes bus 250, output lines from bus agent 200 are tri-stated. At this time, the outputs from both bus agents 200 and 220 are tri-stated, and the pull-up resistors pull the voltage of the bus lines up to a known voltage. The time during which no bus agent is driving bus 250 is known as a dead cycle.

After the dead cycle, bus agent 220 can drive bus 250. To do this, bus agent 220 drives its output lines to the appropriate voltage levels. During the time bus agent 220 drives the bus, the outputs of bus agent 200 are tri-stated. During a dead cycle, all of the bus lines are pulled high, thus differential strobe signals in a differential-strobe source synchronous environment are not complementary during the dead cycle. Circuits, such as input buffers, that receive differential signals under normal bus operation must be designed to operate properly during dead cycles.

Figure 3:
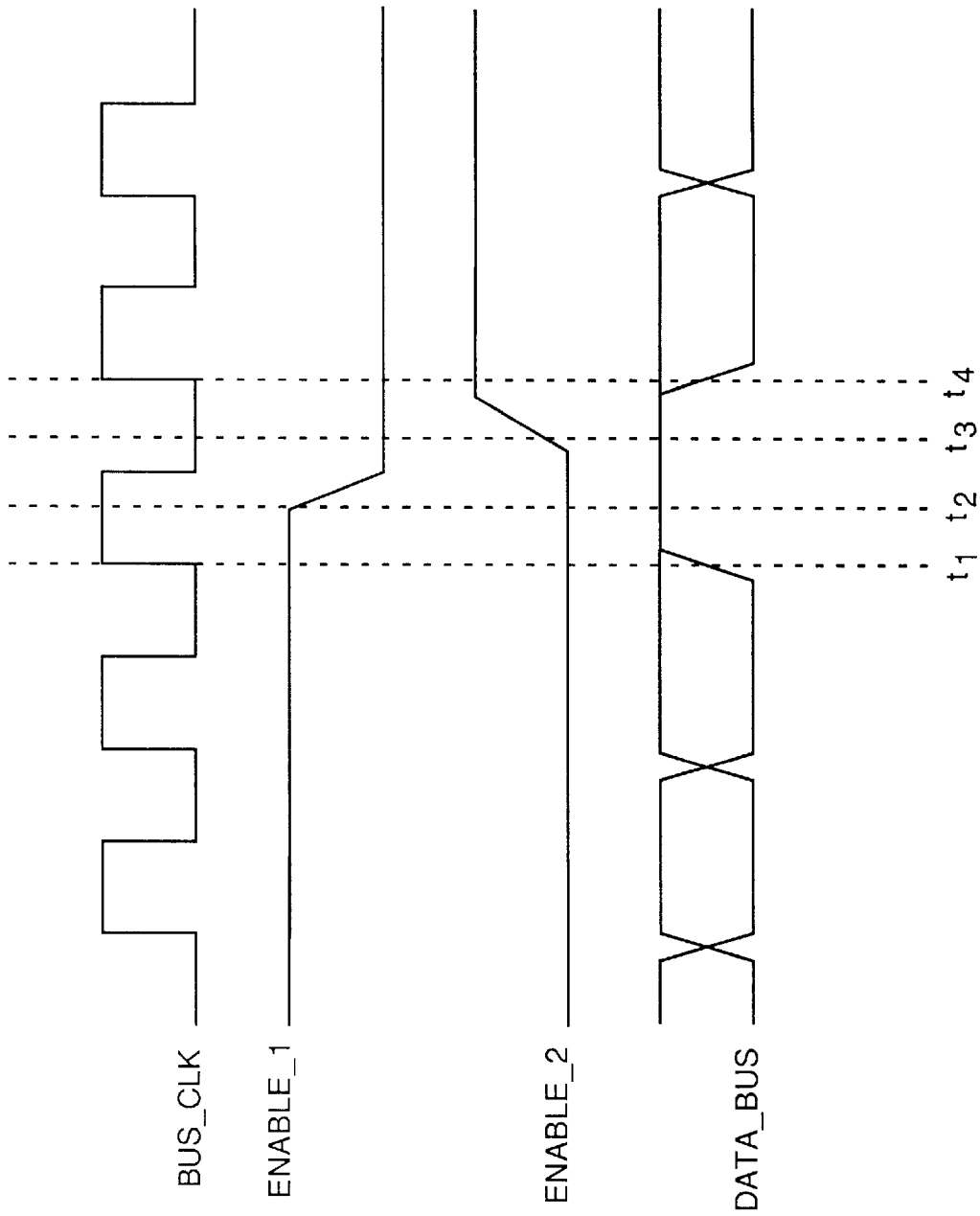
FIG. 3 is one embodiment of a timing diagram for a bus master change-over.

FIG. 3 is one embodiment of a timing diagram for a bus master change-over. The bus agent switch in the example of FIG. 3 is described in terms of thirds of bus clock cycles; however, other cycle fractions can be used to practice the present invention. For example, the bus cycle can be divided into quarters for bus master switches.

The BUS_CLK signal synchronizes bus operations and can operate at any frequency. The ENABLE_1 signal is the enable signal for the first bus agent driving the bus and the ENABLE_2 signal is the enable signal for the second bus agent driving the bus. In one embodiment, when ENABLE_1 is high, the first bus agent is the bus master and when ENABLE_2 is high, the second bus agent is the bus master. Only one ENABLE signal is high at any time in order to avoid contentions on the bus. The DATA_BUS signal generally refers to the signals communicated by the bus such as, for example, data or addresses. It is important to note that the embodiments described herein are not limited to use with two bus agents. Two bus agents are described for simplicity of description because bus master change-overs occur between two bus agents. However, any number of agents can be on the bus.

The dead cycle for the bus master change-over of FIG. 3 includes the time from $t_1$ to $t_4$. Post-driving and pre-driving of the bus limits bus master change-overs to a single bus cycle. Additionally, the amount of time required for a dead cycle can be shortened as compared to bus configurations without post-driving and pre-driving, which can allow BUS_CLK cycles to be shortened thereby increasing performance of the bus.

By time period $t_1$, the first bus agent, which has been acting as the bus master prior to $t_1$ has completed the requested bus transaction. In a bus configuration without post-driving and pre-driving, the ENABLE_1 signal transitions from high to low at $t_1$; however, in order to post-drive the bus, ENABLE_1 is maintained at a high level until $t_2$.

During the time between $t_1$ and $t_2$, the first bus agent drives the lines of the bus to a termination voltage level. This is called "post-driving" the bus. Post-driving the bus provides source termination in addition to the end termination of the termination components, which results in faster settling of the bus than through end termination alone.

After post-driving the bus, the first bus agent maintains the bus lines at the termination voltage levels for a period of time. This is called "parking" the bus. The bus is parked until transients are settled. In one embodiment, termination voltage levels are high voltage levels for the system. In one embodiment, the time between $t_1$ and $t_2$ is one-third of a BUS_CLK cycle; however, the time between $t_1$ and $t_2$ can be more or less of a BUS_CLK cycle than one-third. After parking the bus, the first bus agent tri-states its output buffers to release the bus.

During the time between $t_2$ and $t_3$, both ENABLE_1 and ENABLE_2 are low, which corresponds to neither the first bus agent nor the second bus agent being a bus master. When there is no bus master, the lines of the bus are pulled to, or maintained at the termination voltage level by termination components. Thus, bus lines that have been pulled high during post-driving are driven high by bus termination components to settle transients. In one embodiment, the time between $t_2$ and $t_3$ is one-third of a BUS_CLK cycle; however, other time periods can also be used.

During the time between $t_3$ and $t_4$, the ENABLE_2 signal is high, which causes the second bus agent to pre-drive the bus. Pre-driving the bus settles any transients remaining on the bus. In a bus configuration without active tri-stating and pre-driving, the ENABLE_2 signal remains low until $t_4$ after which remaining transients are settled. To pre-drive the bus, the second bus agent drives the bus lines to the termination voltage level. By driving the bus to termination voltage levels, transients that might otherwise occur at $t_4$ are avoided. After $t_4$, the second bus agent is the bus master and completes a bus transaction in any manner appropriate for the bus. Pre-driving the bus allows the second bus agent to start a transaction at $t_4$ rather than waiting for transients to settle before starting the transaction.

Thus, by post-driving the bus, the first bus agent settles transients faster than would otherwise occur using termination components alone. By pre-driving the bus, the second bus agent can begin a bus transaction sooner than would be possible otherwise because pre-driving settles transients associated with the second bus agent becoming bus master prior to the BUS_CLK cycle that begins the bus transaction. Combination of post-driving and pre-driving shortens the amount of time required for a dead cycle and thereby increases the operational efficiency of the bus.

Figure 4:
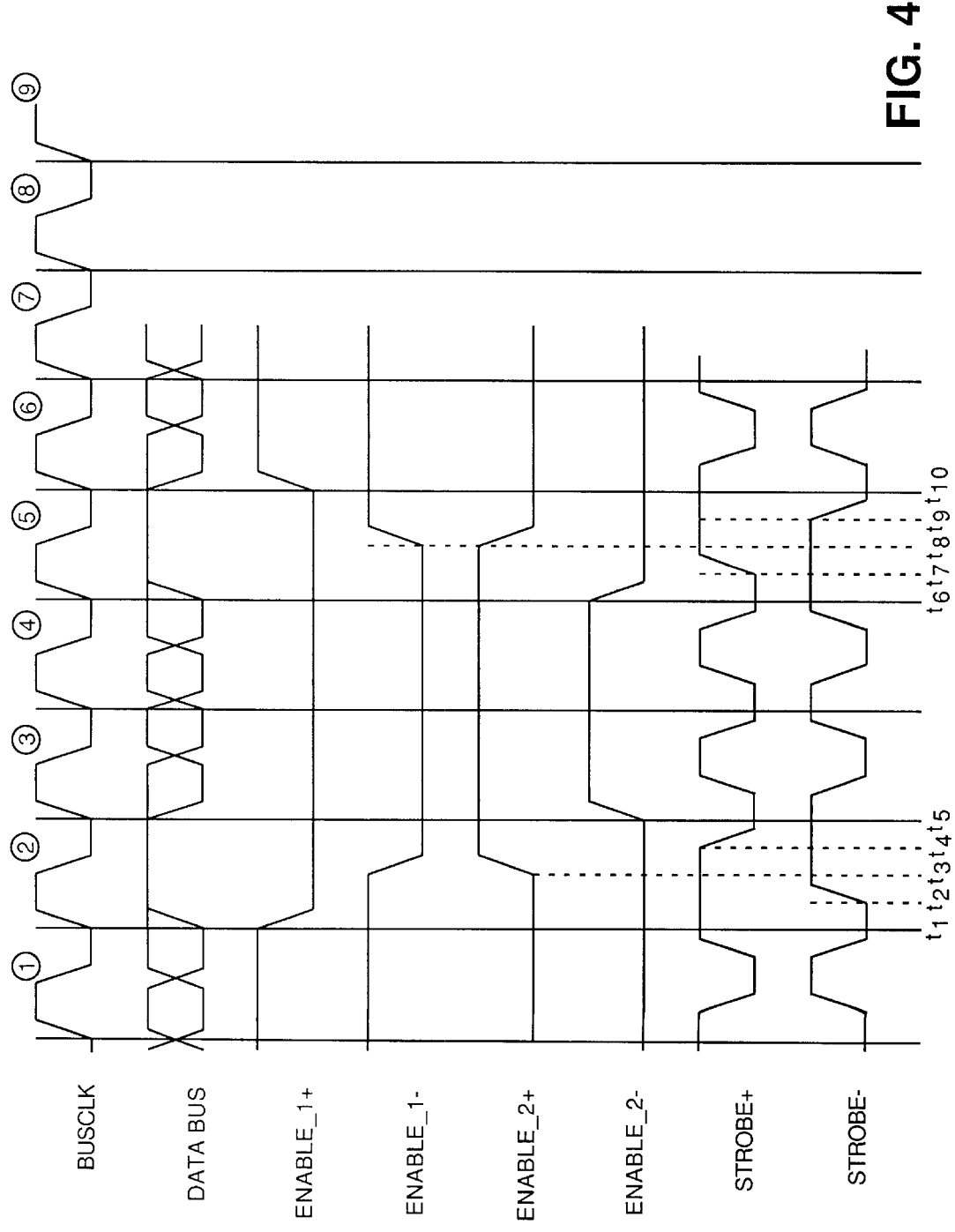
FIG. 4 is one embodiment of a bus master change-over in a source synchronous environment.

FIG. 4 is one embodiment of a bus master change-over in a source synchronous environment. The example of FIG. 4 is a differential-strobe source synchronous environment; however, a single-ended strobe source synchronous environment can also be used.

As with the example of FIG. 3, the BUS_CLK signal is the signal to synchronize bus operations and the DATA_BUS signal generally refers to data signals communicated by the bus. The STROBE+ and STROBE– signals are a pair of strobe signals that are complementary during bus transactions, but not necessarily complementary during dead cycles.

The ENABLE_1+ and ENABLE_1– signals are enable signals for the first bus agent and the ENABLE_2+ and ENABLE_2– are enable signals for the second bus agent. The ENABLE_1+ signal controls post-driving and pre-driving of the STROBE+ line by the first bus agent. Similarly, the ENABLE_1– signal controls the post-driving and pre-driving of the STROBE– line by the first bus agent. The ENABLE_2+ and ENABLE_2– signals control post-driving and pre-driving of the STROBE+ and STROBE– lines, respectively, by the second bus agent.

In the example of FIG. 4, differential strobe signals are used to communicate over the bus. The strobe signals are communicated along with data signals and are used by the receiving bus agent to capture data signals at the appropriate times. In general, source synchronous bus transactions are more efficient than common clocked bus transactions because bus agents are not required to synchronize operations to a common clock. Within the family of source synchronous environments, differential-strobe source synchronous environments provide better noise immunity than single-ended strobe source synchronous environments. However, differential strobes increase the complexity of bus agent change-overs.

In order to provide reliable bus master change-overs, the bus lines are placed in a known state when the bus is released by an old bus master and when the bus is acquired by a new bus master. One way to place the bus in a known state is to drive all bus lines to a known termination voltage during a dead cycle. However, driving all bus lines to a common known state prevents differential strobe signals from operating as differential signals during the bus dead cycle.

Because the strobe signals are differential during normal bus transactions and non-differential during dead cycles, the individual strobe signals cannot be enabled and disabled with a common signal while providing post-driving and pre-driving of bus lines. If a common enable signal were used for both strobe signals, the strobe signals would not be differential at the beginning of a bus cycle, which would cause the bus cycle to be extended by the amount of time required for the strobe signals to become differential. Thus, change-over of differential strobe signals are handled independently with different timing for the different strobe signals.

The time period prior to $t_1$ corresponds to a time in which the first bus agent acts as the bus master. During this time period the pair of strobe signals STROBE+ and STROBE– provide complementary signals. During a dead cycle, the strobe signals are not necessarily complementary, as described below. In a time period prior to $t_1$, both ENABLE_1+ and ENABLE_1– are high, which causes the first bus agent to act as a bus master. Also during the time period prior to $t_1$, both ENABLE_2+ and ENABLE_2– are low, which causes a second bus agent to not drive signals on the bus. It is important to note that the present invention is not limited to two bus agents.

The time period from $t_1$ to $t_5$ is a first dead cycle during which control of the bus passes from the first bus agent to the second bus agent. The time period from $t_6$ to $t_{10}$ is a second dead cycle during which control passes from the second bus agent to the first bus agent. The example of FIG. 4 corresponds to a computer system in which bus accesses require an even number of BUS_CLK cycles. If bus accesses require an odd number of BUS_CLK cycles, the timing of the signals described with respect to FIG. 4 would be the same for the first dead cycle and for the second dead cycle.

In one embodiment, bus agents operate in a ping-ponging manner, which corresponds to the state of the strobe signals alternating between dead cycles. For example, at the end of the first bus cycle the STROBE+ signal is high and the STROBE– signal is low. At the end of a subsequent bus cycle, the STROBE+ signal is low and the STROBE– signal is high. Whether or not bus agents operate in a ping-ponging manner is not necessarily related to the number of BUS_CLK cycles in a bus cycle.

In one embodiment, at $t_1$ the ENABLE_1+ signal goes low, which causes the first bus agent to tri-state the buffer that drives the STROBE+ line. When the first bus agent tri-states the STROBE+ line, the STROBE+ line is pulled high by end termination devices. At $t_3$ the ENABLE_2+ signal goes high, which allows the second bus agent to provide source termination for the STROBE+ line. Thus, between $t_1$ and $t_3$ the STROBE+ line is maintained by end termination devices only.

From $t_3$ to $t_4$ the second bus agent provides source termination for the STROBE+ line. In one embodiment, between $t_3$ and $t_4$ the second bus agent does not actively drive the STROBE+ line. At $t_4$ the STROBE+ line used pre-driven by the second bus agent. In the example of FIG. 4 be STROBE+ line is driven low by the second bus agent. Thus, at $t_5$ when the second bus agent begins the bus cycle the STROBE+ line is low, which allows the second bus agent to immediately begin a bus cycle. During the time period between $t_4$ and $t_5$, the second bus agent pre-drives the bus.

At $t_2$ the STROBE– line is post-driven high by the first bus agent. At $t_3$ the ENABLE_1– signal goes low, which tri-states the buffer that drives the STROBE– line. Thus, at $t_3$ the first bus agent parks the STROBE– line. Between $t_3$ and $t_5$ the STROBE– line is driven high by end termination devices. At $t_5$ the second bus agent picks up the STROBE– line and actively drives the STROBE– line.

In one embodiment, the ENABLE_1– signal goes low at the same time that be ENABLE_2+ signal goes high; however, such timing is not required. The transition of ENABLE_1– from high to low can occur before or after the transition of ENABLE_2+ from low to high.

During the second dead cycle from $t_6$ to $t_{10}$ the second bus agent transfers control back to the first bus agent. It is important to note that the same change-over would occur if the second bus agent transfers control of the bus to a bus agent other than the first bus agent. In one embodiment, at $t_6$ the ENABLE_2– signal goes low, which causes the second bus agent to tri-state the STROBE– line. From $t_6$ to $t_8$ the STROBE– line is maintained high by end termination devices only.

In one embodiment, at $t_8$ the ENABLE_1– line goes high which causes the first bus agent to pick up the STROBE– line. From $t_8$ to $t_9$ the first bus agent provides source termination for the STROBE– line; however, the first bus agent does not actively drive the STROBE– line between $t_8$ and $t_9$. At $t_9$ the first bus agent actively drives, or pre-drives, the STROBE– line. Thus, at $t_{10}$ when the first bus agent begins the bus cycle the STROBE– line has been driven low, which allows the first bus agent to immediately begin a transaction with the STROBE+ and STROBE– signals operating as differential strobe signals.

In one embodiment, at $t_8$ the ENABLE_2+ signal goes low, which causes the second bus agent to tri-state the STROBE+ line. Between $t_8$ and $t_{10}$ the STROBE+ line is maintained high by bus termination devices. At $t_{10}$ the ENABLE_1+ signal goes high, which causes the first bus agent to actively drive the STROBE+ line.

Thus, the bus agent giving up control of the bus post-drives the strobe signal that is low and the bus lines at the beginning of the dead cycle. The bus agent gaining control of the bus pre-drives the bus lines and the strobe lines during the end of the dead cycle. By post-driving and pre-driving the bus, transients are settled more quickly than would otherwise occur. Reduced settling time reduces the amount of time needed for dead cycles, which increases performance of the bus.

Figure 5:
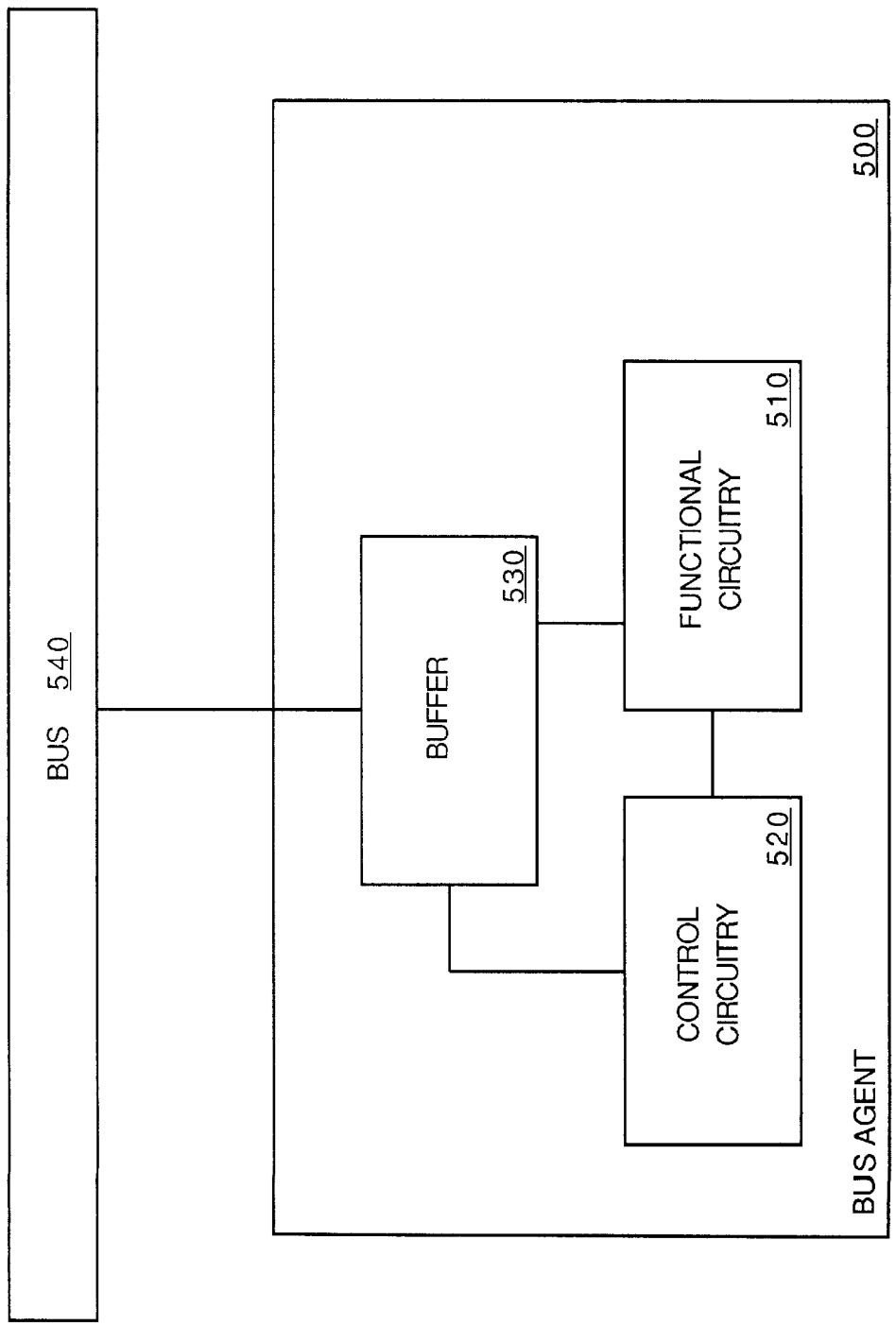
FIG. 5 is one embodiment of a block diagram of a bus agent.

FIG. 5 is one embodiment of a block diagram of a bus agent. The bus agent of FIG. 5 is intended to represent any agent that is coupled to and can communicate over a bus. The description with respect to FIG. 5, therefore, is not limited to any particular type of bus agent.

Bus agent 500 generally includes functional circuitry 510, control circuitry 520 and buffer 530. Functional circuitry 510 is the circuitry of bus agent 500 that performs the functions of bus agent 500. For example, if bus agent 500 is a memory device, functional circuitry 510 can be a memory array. Functional circuitry 510 is coupled to control circuitry 520, which provides control functions appropriate for functional circuitry 510 and for buffer 530.

Buffer 530 is coupled to functional circuitry 510 and to control circuitry 520. Buffer 530 can be an output buffer or an input/output buffer. Control circuitry 520 provides control signals to buffer 530 such that buffer 530 operates as described above with respect to FIGS. 3 and 4. Buffer 530 is coupled to bus 540 to communicate data and strobe signals as described above.

In the foregoing specification, the present invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:
   a first bus agent post-driving data bus lines to a known voltage for a predetermined period of time after the first bus agent completes a first bus access cycle;

terminating components on the data bus maintaining the bus lines at the known voltage; and a second bus agent pre-driving the data bus lines to the known voltage prior to the second bus agent starting a second bus access cycle.

2. The method of claim 1, wherein post-driving the bus lines, maintaining the bus lines with the first bus agent, maintaining the bus lines with the termination components, and pre-driving the bus lines are performed during a single bus clock cycle.

3. The method of claim 1, wherein the first bus agent and the second bus agent are source synchronous devices.

4. The method of claim 1, wherein driving bus lines to a known voltage with a first bus agent further comprises:
   tri-stating a first strobe signal;

driving a second strobe signal and the bus lines to the known voltage level for the predetermined period of time; and tri-stating the second strobe signal and the bus lines after driving the second strobe signal and the bus lines to the known voltage level for the predetermined period of time.

5. The method of claim 1, wherein maintaining the bus lines at the known voltage with a second bus agent further comprises:

driving a first strobe signal to the known voltage for a first predetermined period of time prior to beginning the second bus access cycle; and driving a second strobe signal to the known voltage a second predetermined period of time after driving the first strobe signal to the known voltage.

6. An apparatus comprising:

a terminated bus in which one or more lines of the bus are driven to a known voltage when the one or more lines are not externally driven;

a first bus agent coupled to the bus, wherein the first bus agent drives the one or more lines of the bus to the known voltage for a first predetermined period of time after completing a first bus access cycle; and a second bus agent coupled to the bus, wherein the second bus agent drives the one or more lines of the bus to the known voltage for a second predetermined period of time prior to starting a second bus access cycle.

7. The apparatus of claim 6, wherein the first bus agent and the second bus agent are source synchronous devices.

8. The apparatus of claim 6, wherein the first bus agent tri-states a first strobe signal after completing the first bus access cycle and drives a second strobe signal to the known voltage level for the first predetermined time after completing the first bus access cycle.

9. The apparatus of claim 6, wherein the second bus agent drives a first strobe signal to a known voltage the second predetermined period of time prior to beginning the second bus access cycle and drives a second strobe signal to the known voltage a third predetermined period of time after driving the first strobe signal to the known voltage.

10. A bus agent comprising:

means for post-driving one or more data bus lines after completing a bus transaction in which the bus agent is a bus master;

means for terminating components on the data bus maintaining the bus lines at the known voltage; and means for pre-driving one or more data bus lines prior to a bus transaction in which the bus agent will be the bus master.

11. The bus agent of claim 10, wherein the bus agent is a source synchronous bus agent.

12. The bus agent of claim 10, wherein the bus agent is a processor.

13. A bus agent comprising:

an input/output (I/O) buffer to communicate with a terminated data bus; and a control circuit coupled to the I/O buffer that causes the I/O buffer to post-drive one or more lines of the terminated data bus to a known voltage subsequent to completion of a first bus access cycle in which the bus agent is a bus master and further wherein the control circuit causes the I/O buffer to pre-drive the one or more lines of the terminated data bus to the known voltage prior to a second bus access in which the bus agent is the bus master.

14. The bus agent of claim 13, wherein the one or more lines of the bus include a strobe signal.

15. A system comprising:

a terminated bus;

a first bus agent coupled to the terminated bus; the first bus agent to post-drive one or more lines of the terminated data bus to a known voltage subsequent to completion of a bus access cycle in which the first bus agent is a bus master and to pre-drive the one or more lines of the terminated data bus to the known voltage prior to a bus access in which the first bus agent is the bus master; and a second bus agent coupled to the terminated bus.

16. The system of claim 15, the second bus agent to post-drive one or more lines of the terminated bus to the known voltage subsequent to completion of a bus access cycle in which the second bus agent is a bus master and to pre-drive the one or more lines of the terminated data bus to the known voltage prior to a bus access in which the second bus agent is the bus master.

17. The system of claim 15, wherein the first bus agent and the second bus agent are source synchronous devices.

18. The system of claim 15, wherein the first bus agent comprises a processor and the second bus agent comprises a memory.

19. The system of claim 15, wherein the first bus agent comprises a first processor and the second bus agent comprises a second processor.

* * * * *